United States Patent
Fengler et al.

(10) Patent No.: US 12,071,249 B2
(45) Date of Patent: Aug. 27, 2024

(54) METHOD AND DEVICE FOR DETERMINING ICING ON AN AIRCRAFT, AND AIRCRAFT

(71) Applicant: METEOMATICS AG, St. Gallen (CH)

(72) Inventors: Martin Fengler, St. Gallen (CH); Lukas Hammerschmidt, St. Gallen (CH); Christopher Hartmann, St. Gallen (CH); Daniel Schmitz, St. Gallen (CH); Philipp Kryenbühl, St. Gallen (CH); Benjamin Koffel, St. Gallen (CH); Raphael Storchenegger, St. Gallen (CH); Mathias Haukås, St. Gallen (CH); Dominik Schindler, St. Gallen (CH); Jürg Wildi, St. Gallen (CH)

(73) Assignee: METEOMATICS AG, St. Gallen (CH)

( * ) Notice: Subject to any disclaimer, the term of this patent is extended or adjusted under 35 U.S.C. 154(b) by 0 days.

(21) Appl. No.: 17/557,726

(22) Filed: Dec. 21, 2021

(65) Prior Publication Data
US 2022/0194605 A1     Jun. 23, 2022

(30) Foreign Application Priority Data
Dec. 22, 2020   (DE) .......................... 102020134597.6

(51) Int. Cl.
*B64D 15/22*    (2006.01)
*B64D 41/00*    (2006.01)

(52) U.S. Cl.
CPC ............. *B64D 15/22* (2013.01); *B64D 41/00* (2013.01)

(58) Field of Classification Search
CPC ................................ B64D 15/20; B64D 15/22
See application file for complete search history.

(56) References Cited

U.S. PATENT DOCUMENTS

| | | | |
|---|---|---|---|
| 7,014,357 B2 | 3/2006 | Severson | |
| 2010/0012785 A1* | 1/2010 | Mackin | B64D 15/20 244/134 F |

(Continued)

FOREIGN PATENT DOCUMENTS

| | | |
|---|---|---|
| DE | 60303426 T2 | 10/2006 |
| EP | 3766782 A1 | 1/2021 |

OTHER PUBLICATIONS

Autopilot Basics, IFR Magazine, https://www.ifr-magazine.com/avionics/autopilot-basics/, Jul. 11, 2018 (Year: 2018).*

(Continued)

*Primary Examiner* — Timothy D Collins
*Assistant Examiner* — Terri L Filosi
(74) *Attorney, Agent, or Firm* — Buchanan Ingersoll & Rooney PC

(57) ABSTRACT

A method and a device are disclosed for determining icing on an aircraft, as well as an aircraft. The method can include acquiring a current flight state of the aircraft, acquiring current flight conditions of the aircraft, estimating an estimated power feed of a power supply of the aircraft for the current flight state under the current flight conditions, comparing the estimated power feed with an actual power feed of the power supply of the aircraft, and determining a presence of icing on the aircraft when a probability of an existence of icing conditions exceeds a predetermined probability threshold and the estimated power feed exceeds the actual power feed by a predetermined amount.

21 Claims, 3 Drawing Sheets

(56) References Cited

U.S. PATENT DOCUMENTS

Figure 2:
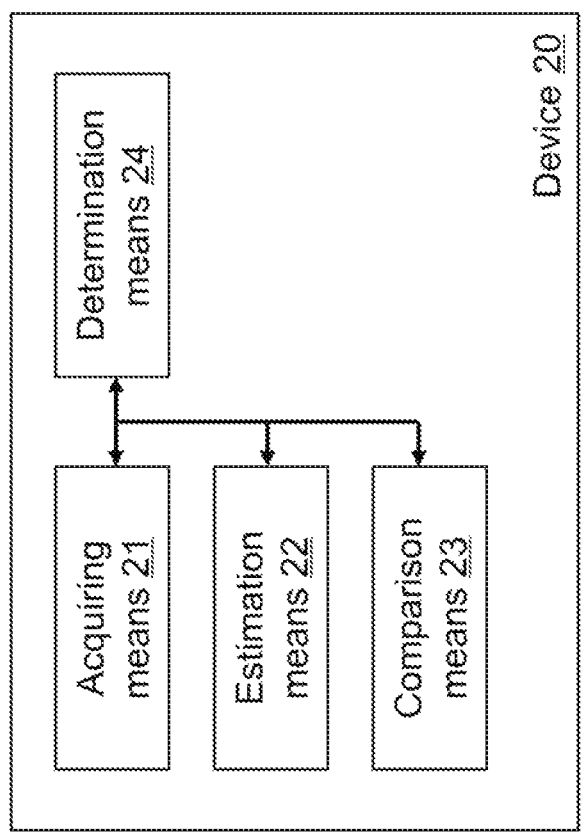

| | | | |
|---|---|---|---|
| 2010/0282910 A1 | 11/2010 | Stothers et al. | |
| 2011/0106331 A1 | 5/2011 | Heuer et al. | |
| 2013/0341464 A1 | 12/2013 | Stothers et al. | |
| 2015/0346122 A1 | 12/2015 | Stothers et al. | |
| 2017/0370960 A1* | 12/2017 | Benning | G01K 13/028 |
| 2018/0327100 A1* | 11/2018 | Froman | B64D 15/12 |
| 2019/0193866 A1* | 6/2019 | Deiler | G05B 23/0254 |
| 2019/0300183 A1 | 10/2019 | Clavel et al. | |
| 2021/0016886 A1* | 1/2021 | LoPresto | G01P 13/025 |

OTHER PUBLICATIONS

Office Action issued on Nov. 20, 2021, by the German Patent Office in corresponding German Patent Application No. 10 2020 134 597.4. (6 pages).

* cited by examiner

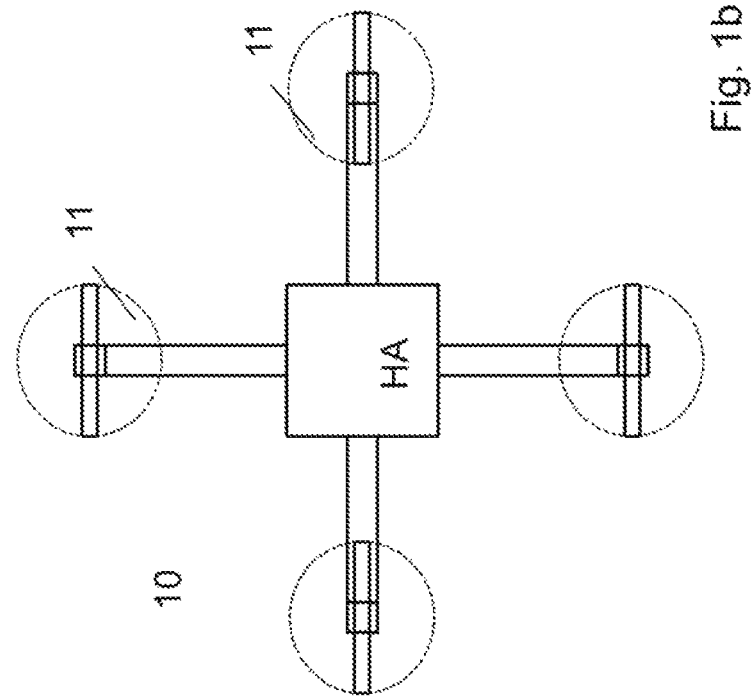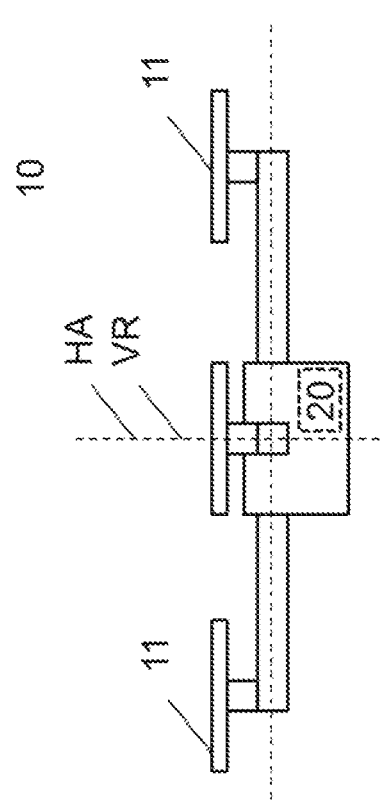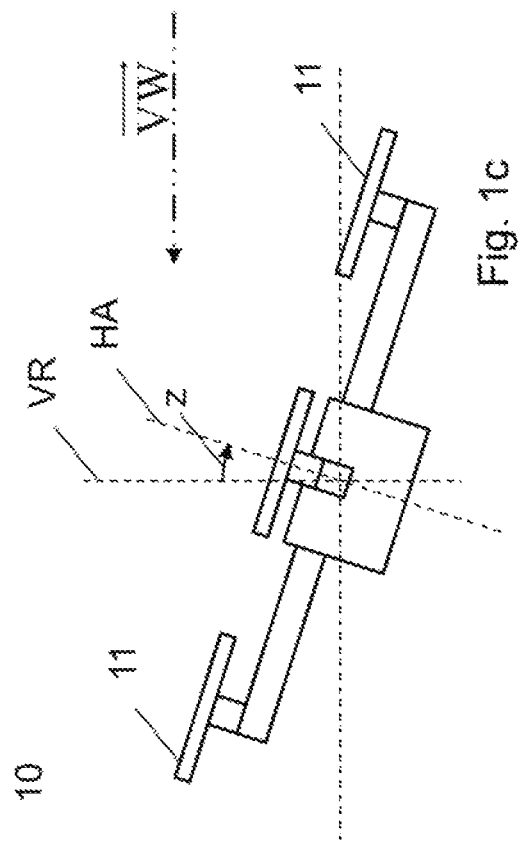

METHOD AND DEVICE FOR DETERMINING ICING ON AN AIRCRAFT, AND AIRCRAFT

Icing presents a serious risk to aircrafts. Icing has caused numerous aircraft accidents. Icing leads to a change in the aerodynamic shape of elements of aircrafts. Besides, icing leads to an increase in the weight of the aircraft. Both may affect the stability and controllability of aircrafts. Specifically the lift or, in the case of e.g. rotating drive elements, the propulsion is deteriorated by the said change in the aerodynamic shape.

Therefore, techniques for avoiding icing ("anti-icing") and techniques for removing icing ("de-icing") have been developed for aircrafts.

Icing occurs under so-called icing conditions. Icing conditions are such under which e.g. air (flown through) contains drops of undercooled liquid water. This is prevailing, for example, when there are temperatures of less than 0° C. with fog or a cloud being present at the same time.

Icing counter-measures can be activated generally, i.e. independent of whether icing is prevailing, or not. However, this causes an increased power requirement (e.g. in the case of electrical or electromechanical or electrohydraulic icing counter-measures) or increased operating resource requirements (e.g. in the case of chemical icing counter-measures).

Power and weight are generally a limiting factor for aircrafts. For example, an increased weight reduces an achievable flight time. Furthermore, an increased power requirement (e.g. requirement of electrical energy for electrically driven aircrafts such as multicopters having electric motors and rotors as lift generating elements) reduces an achievable flight time.

On the other hand, for reasons of efficiency, icing counter-measures should preferably only be activated when icing is actually prevailing. This requires, however, that icing is ascertained.

For instance, it may be assumed that icing is actually prevailing when there are icing conditions (e.g. when, at temperatures of less than 0° C., fog or a cloud is flown through at the same time). However, as icing not always actually takes place under icing conditions, this, too, causes an increased power requirement (e.g. for electrical or electromechanical or electrohydraulic icing counter-measures) or increased operating material requirements (e.g. for chemical icing counter-measures).

On the other hand, the actual presence of icing can also be ascertained sensorically. This may e.g. be done by the detection of a liquid water content (LWC) and/or an ice water content (IWC) of the ambient air. However, for such a sensory detection, a suitable sensor system, which is configured to detect a liquid water content (LWC) and/or an ice water content (IWC) of the ambient air, has to be carried along. Especially in the case of small aircrafts, such as drones designed as multicopters, carrying along an additional sensor system means additional weight which, in turn, has a negative effect on an achievable flight time.

The invention indicated in claim 1 is based on the object of overcoming the disadvantages and problems arising in connection with the measures known from the prior art, thereby lowering the energy consumption of aircrafts, in particular, while achieving reductions in the weight of aircrafts.

This problem is solved by the features indicated in claim 1.

In particular, a method provided according to the invention for determining icing on an aircraft comprises the steps of acquiring a current flight state of the aircraft, acquiring current flight conditions of the aircraft, estimating an estimated power feed of a power supply of the aircraft for the current flight state under the current flight conditions, comparing the estimated power feed with an actual power feed of the power supply of the aircraft, and determining a presence of icing on the aircraft when a probability of an existence of icing conditions exceeds a predetermined probability threshold and the estimated power feed exceeds the actual power feed by a predetermined amount.

The invention is particularly advantageous in that, by the determination of the presence of icing by means of a comparison of an estimated and an actual power feed, no additional sensor system is necessary. The aircraft itself is used as sensor. In this way, the weight of the aircraft as well as the cost thereof can be reduced. Generally speaking, icing conditions exist for example when the air (through which the aircraft flows) contains drops of undercooled liquid water.

According to an advantageous further development of the invention, the method may further comprise the steps of acquiring environmental conditions of the aircraft, determining the probability of the existence of icing conditions based on the environmental conditions, and ascertaining whether the probability of an existence of icing conditions exceeds the predetermined probability threshold.

Only when icing conditions which make icing possible and probable are really prevailing, actual icing is assumed if there is an exceptional power feed level. If there are no icing conditions (or if their probability is too low), other circumstances must be the cause of the exceptional power feed level. Then, however, no icing counter-measures have to be taken, so that the consumptions caused thereby can be avoided.

According to an advantageous further development of the invention, the environmental conditions can comprise an ambient temperature and an ambient air humidity. Preferably, the ambient air humidity is a relative air humidity. Alternatively, the ambient air humidity can be an absolute air humidity.

According to an advantageous further development of the invention, the environmental conditions can further comprise at least one of a flight height of the aircraft, an ambient air pressure, an ambient dew point, a liquid water content (LWC), an ice water content (IWC), and a median volume diameter (MVD).

According to an advantageous further development of the invention, the power supply can be an electric power source, the estimated power feed can be at least one of an electric current, an electric voltage and an electrical power, and the actual power feed can be at least one of an electric current, an electric voltage, and an electrical power. Alternatively, the power supply can, however, also fall back on energy deviating from the electric power. For instance, the power supply can be a power supply by means of fuel energy. The fuel may e.g. be gas or diesel. Furthermore, the fuel may also be hydrogen. In such cases, the estimated and the actual power feed may be an amount of fuel fed to drive elements or lift-generating members. Furthermore, in such cases, the estimated and the actual power feed can be an amount of fuel fed to a generator for an electric energy generation.

According to an advantageous further development of the invention, the estimating of the estimated power feed can comprise a calculation of the estimated power feed for the current flight state under the current flight conditions by using a model of the aircraft. The model may e.g. be defined by a mathematical formula or a look-up table, but is not restricted thereto.

According to an advantageous further development of the invention, the model of the aircraft can characterize at least one of a mass of the aircraft, a shape of the aircraft, power consumption properties of a drive means of the aircraft and a propeller geometry of the aircraft.

According to an advantageous further development of the invention, the method can further comprise the step of measuring the actual power feed.

According to an advantageous further development of the invention, the method can further comprise the step of triggering icing counter-measures of the aircraft only when or exactly when the presence of icing on the aircraft is determined. The icing counter-measures can comprise a heating of, for example, control surfaces, lifting surfaces, drive elements and/or lift-generating members of the aircraft, a discharge of chemical de-icing agents, for example on control surfaces, lifting surfaces, drive elements and/or lift-generating members of the aircraft and/or a controlling of mechanical de-icing measures regarding, for example, control surfaces, lifting surfaces, drive elements and/or lift-generating members of the aircraft, but are not restricted thereto.

In this way, the icing counter-measures can only be initiated when they are actually necessary, i.e. when an actual icing is assumed. Thereby, the resource "energy", which is regularly scarce and limited with an aircraft, can be optimally applied. If the icing counter-measures comprise the consumption of further operating resources in addition to or instead of a consumption of energy, also these operating resources can be applied optimally; thus, either less of these operating resources have to be carried along (weight reduction) or, with the same amount of operating resources carried along, a longer operability under icing conditions or in the case of actual icing is possible.

According to an advantageous further development of the invention, the predetermined amount can comprise at least a first predetermined amount and a second predetermined amount which is larger than the first predetermined amount. Furthermore, the determining of the presence of icing on the aircraft can comprise ascertaining a presence of a first degree of icing on the aircraft, when the estimated power feed exceeds the actual power feed by the first predetermined amount, and ascertaining a presence of a second degree of icing on the aircraft which is higher than the first degree of icing on the aircraft, when the estimated power feed exceeds the actual power feed by the second predetermined amount.

According to an advantageous further development of the invention, the method can further comprise the step of outputting the ascertained degree of icing on the aircraft.

In this way, the meteorological measurement variable "icing" can be gained. Thereby, meteorological models and forecasts can be improved. Finally, according to the invention, this meteorological measurement variable "icing" is adapted to be quantified and divided into specific groups. These groups can comprise the groups "light icing", "moderate icing" and "severe icing", which are known from aviation.

According to an advantageous further development of the invention, the method can further comprise the step of triggering icing counter-measures of the aircraft only when or exactly when the presence of the second degree of icing on the aircraft has been ascertained. The icing counter-measures can comprise a heating of, for example, control surfaces, lifting surfaces, drive elements and/or lift-generating members of the aircraft, a discharge of chemical de-icing agents, for example on control surfaces, lifting surfaces, drive elements and/or lift-generating members of the aircraft and/or a controlling of mechanical de-icing measures regarding, for example, control surfaces, lifting surfaces, drive elements and/or lift-generating members of the aircraft, but are not restricted thereto.

In this way, the icing counter-measures can only be initiated when they are actually necessary, i.e., when an actual icing is assumed. Thereby, the resource "energy", which is regularly scarce and limited with an aircraft, can be optimally applied. If the icing counter-measures comprise the consumption of further operating resources in addition to or instead of a consumption of energy, also these operating resources can be applied optimally; thus, either less of these operating resources have to be carried along (weight reduction) or, with the same amount of operating resources carried along, a longer operability under icing conditions or in the case of actual icing is possible.

According to an advantageous further development of the invention, the method can further comprise the step of verifying the determined presence of icing on the aircraft based on a temporal development of a difference between the estimated power feed and the actual power feed after the triggering of icing counter-measures of the aircraft.

According to an advantageous further development of the invention, the method can further comprise the step of triggering a predetermined flight maneuver, for which an effect of a presence of icing on a difference between the estimated power feed and the actual power feed is expected, under a predetermined triggering condition. The predetermined triggering condition can comprise a manual triggering, for example. The predetermined triggering condition can further comprise an automatic triggering, for example. The automatic triggering can, for example, be a triggering at any predetermined time interval. The automatic triggering can further be a triggering, for example, when a probability of an existence of icing conditions exceeds a predetermined probability threshold for a predetermined period of time. The predetermined triggering condition is, however, not restricted to the examples mentioned. The predetermined flight maneuver can be one where icing has a particular effect on the flight properties of the aircraft and/or on the power requirement due to execution of the flight maneuver. The flight maneuver can further be one where other possible influencing variables (other than icing) are minimized, but is not restricted thereto.

By a predetermined flight maneuver for ascertaining a possibly actual icing being initiated, one may, for example, react to a possibly existing confirmed suspicion of an actual icing.

According to an advantageous further development of the invention, the current flight state of the aircraft can comprise at least one of a flight height of the aircraft, a flight speed of the aircraft over ground, a climbing speed of the aircraft, a sinking speed of the aircraft, a rotation of the aircraft, a flight attitude of the aircraft, a position of the aircraft, and an extent of an electrical heating of a component of the aircraft. The position of the aircraft can, for example, also comprise a deviation of the aircraft from a respective target variable, but is not restricted thereto.

According to an advantageous further development of the invention, the current flight conditions of the aircraft can comprise at least one of an ambient temperature of the aircraft, an ambient air humidity of the aircraft, an ambient air pressure of the aircraft, an estimated ambient wind speed of the aircraft, an air drag of the aircraft, and a lift of the aircraft.

According to an advantageous further development of the invention, the method can further comprise the steps of detecting a crosswind-caused deviation of the aircraft from a target absolute position, feedback controlling an absolute position of the aircraft to the target absolute position based on the crosswind-caused deviation of the aircraft from the target absolute position by controlling drive elements of the aircraft, establishing an expected value of a power requirement of the feedback control as the estimated power feed of the power supply of the aircraft, based on the crosswind-caused deviation of the aircraft from the target absolute position, and measuring a measurement value of the power requirement of the feedback control as the actual power feed of the power supply of the aircraft, based on power fed to the drive elements. An absolute position can be an absolute position of the aircraft in space, ascertained by means of a global position system.

According to an advantageous further development of the invention, the target absolute position can be a target trajectory or a target motion path. Furthermore, the absolute position can be a trajectory or a motion path.

The problem is also solved by the features indicated in claim 19.

In particular, a device for determining icing on an aircraft, provided according to the present invention, comprises an acquiring means which is configured to acquire a current flight state of the aircraft, and to acquire current flight conditions of the aircraft, an estimation means which is configured to estimate an estimated power feed of a power supply of the aircraft for the current flight state under the current flight conditions, a comparison means which is configured to compare the estimated power feed with an actual power feed of the power supply of the aircraft, and a determination means which is configured to determine a presence of icing on the aircraft when a probability of an existence of icing conditions exceeds a predetermined probability threshold and the estimated power feed exceeds the actual power feed by a predetermined amount. The acquiring means, the estimation means, the comparison means and/or the determination means can each be embodied by one or more appropriate control devices. Each of the control devices can comprise at least one processor (e.g. microprocessor, central processing unit (CPU)) and at least one memory (e.g. random access memory (RAM), read only memory (ROM)). Each of the control devices can comprise one or more interfaces (e.g. for a communication with other control devices). The acquiring means, the estimation means, the comparison means and/or the determination means can equally be embodied by at least one processor and at least one memory as well as one or more interfaces.

The problem is equally solved by the features indicated in claim 21.

In particular, an aircraft provided according to the present invention comprises an above-described device according to the invention for determining icing on the aircraft and at least one lift-generating member which is configured to generate lift.

The aircraft can be a monocopter having a driven rotor as lift-generating member or a multicopter having two, three, four, six, eight or twelve driven rotors as lift-generating members, but is not restricted thereto.

Figure 3:
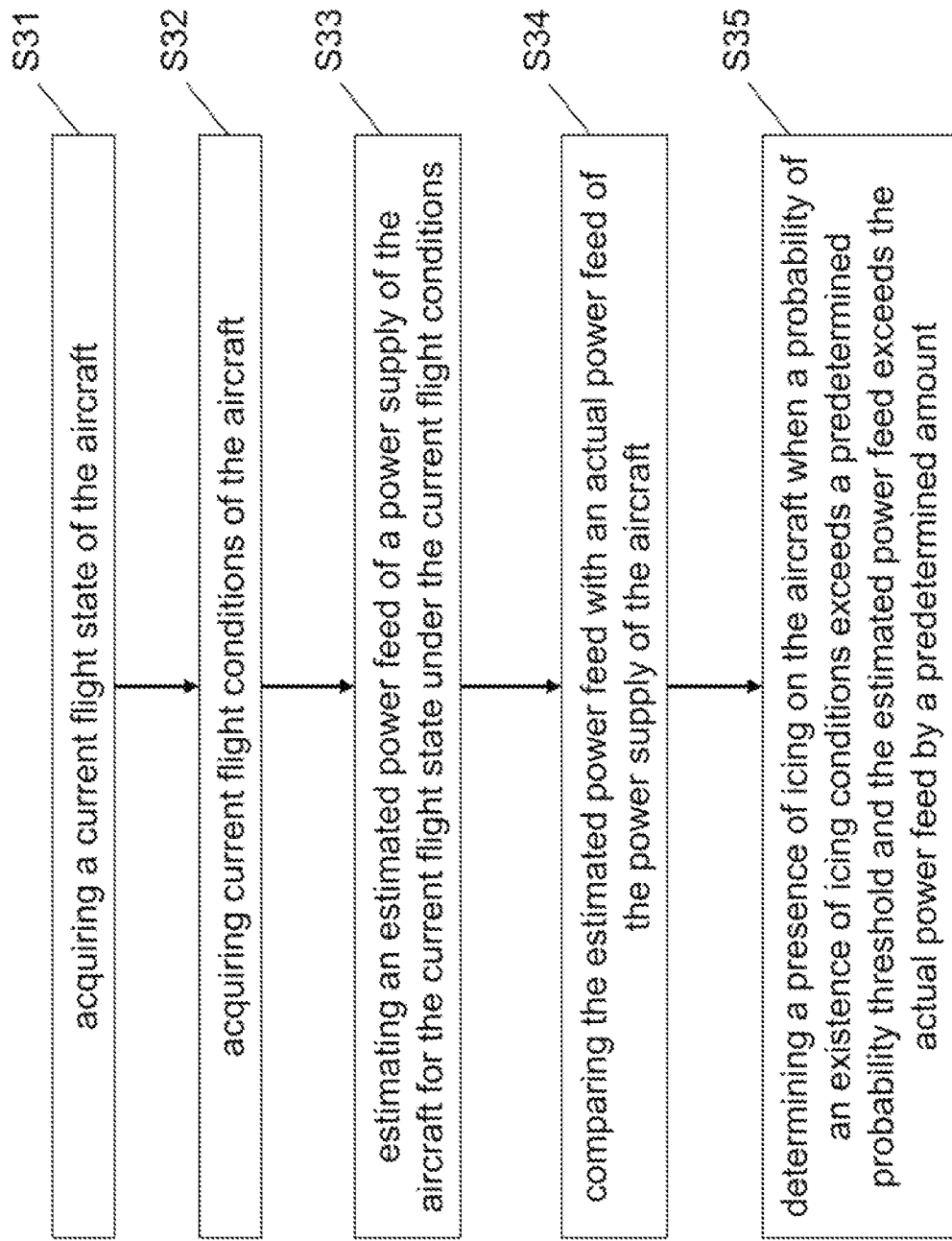

One embodiment of the invention is described in greater detail by means of the attached drawing, in which FIG. 1 (FIGS. 1a to 1c) schematically shows an aircraft according to an embodiment of the present invention, FIG. 2 schematically shows a device according to an embodiment of the present invention, and FIG. 3 schematically shows a method according to an embodiment of the present invention.

FIG. 1a shows an aircraft 10 according to an embodiment of the present invention in an upright attitude, i.e., the vertical axis HA of the aircraft 10 (also designated as "yaw axis") is not inclined. The vertical axis HA of the aircraft 10 corresponds to an axis in the vertical direction (VR). FIG. 1a shows, by way of allusion, that the aircraft 10 comprises a device 20 according to the invention. Furthermore, the aircraft 10 at least comprises a lift-generating member 11, which is e.g. a motor with a rotor fastened thereto. The motor can e.g. be an electric motor or an internal combustion engine.

FIG. 1b shows the aircraft 10 from the top in the direction of the vertical axis HA of the aircraft 10. The aircraft shown in FIG. 1b by way of an example comprises four lift-generating members 11. However, the number of the lift-generating members is not restricted to four. The dotted circles presented around the lift-generating members 11 shown in FIG. 1c suggest the rotation of possible rotors of the lift-generating members.

FIG. 1c shows the aircraft 10 in an attitude inclined vis-à-vis the axis in the vertical direction (VR), i.e., the vertical axis HA of the aircraft 10 does not correspond to the axis in the vertical direction (VR), but is inclined away from this axis in the vertical direction (VR) by an angle z. The aircraft 10 in FIG. 1c is inclined to the right, the direction of the inclination in a plane being perpendicular to the vertical direction (VR) shows exactly to the right. FIG. 1c further only schematically shows the speed vector $\vec{VW}$ of the wind prevailing in the environment of the aircraft 10 (crosswind), which could cause a deviation of the aircraft from a target absolute position.

FIG. 2 shows that, according to an embodiment of the present invention, the device 20, which is suggestively shown in FIG. 1a, comprises an acquiring means 21, an estimation means 22, a comparison means 23, and a determination means 24.

The acquiring means 21 acquires a current flight state of the aircraft (e.g. in accordance with step S31 of FIG. 3).

The acquiring means 21 acquires current flight conditions of the aircraft (e.g. in accordance with step S32 of FIG. 3).

The estimation means 22 estimates an estimated power feed of a power supply of the aircraft for the current flight state under the current flight conditions (e.g. in accordance with step S33 of FIG. 3).

The comparison means 23 compares the estimated power feed with an actual power feed of the power supply of the aircraft (e.g. in accordance with step S34 of FIG. 3).

The determination means determines a presence of icing on the aircraft when a probability of an existence of icing conditions exceeds a predetermined probability threshold and the estimated power feed exceeds the actual power feed by a predetermined amount (in accordance with step S35 of FIG. 3, for example).

As, particularly in the case of aircrafts, carrying along energy sources is limited for reasons of weight, an execution of icing counter-measures at times when there is actually no icing at all would entail an unnecessary energy consumption. This unnecessary energy consumption would, for instance, shorten a possible flight time. Accordingly, a possible traveling distance would be reduced.

Therefore, according to the present invention, not only prevailing icing conditions are considered, but the actual presence of icing. The actual presence of icing could be ascertained by additional sensor systems. These, however, mean additional weight, which would shorten a possible flight time and would accordingly reduce a possible traveling distance.

Therefore, according to the present invention, the actual presence of icing is assumed when, under icing conditions, energy consumption considerably differs from an estimated energy consumption, particularly when it is considerably higher.

Namely, icing of control surfaces, lift surfaces, drive elements and/or lift-generating members of the aircraft, i.e., the deposition of ice on the control surfaces, lift surfaces, drive elements and/or lift-generating members of the aircraft, leads to a decrease of the lift of the aircraft and/or the controllability thereof. A desired lift or a desired controllability can, within certain limits, be achieved by, for example, control surfaces being deflected to a greater extent, or drive elements and/or lift-generating members being driven to a greater extent.

For example, if, by a flight control, control surfaces are deflected to a greater extent or drive elements and/or lift-generating members are driven to a greater extent, the power requirement for the control operation concerned rises.

For example, a rotational speed of an electric motor increases by an increase of the electrical energy fed in the form of current and voltage.

In the case of aircrafts, particularly in the case of multicopters, crosswinds can easily be compensated for by an inclination of the aircraft, which is determined based on the effect of the crosswinds (e.g. lateral displacement of the position of the aircraft). If, now, power actually used for a specific flight maneuver (e.g. taking the aircraft back to a target position or a target trajectory (target flight path) from which the aircraft has deviated, for example due to a crosswind effect, e.g. by an inclination of the aircraft (shown in FIG. 1c)) against the speed vector $\overrightarrow{VW}$ of the wind (crosswind) prevailing in the vicinity of the aircraft 10) is verified as against a power estimated for this flight maneuver in case there is no icing, with a difference exceeding a specific threshold being ascertained (actually used power is larger than the power estimated for this flight maneuver), it will be assumed that the increased power requirement originates from the actual icing of e.g. control surfaces, lift surfaces, drive elements and/or lift-generating members of the aircraft.

The flight control can, for example, be based on that an actual absolute position of the aircraft (detected by means of a global position system, for example) is compared with a given target position and the absolute position of the aircraft is controlled to reach the given target position.

The estimated power can be ascertained by means of a modeling of the flight behavior of the aircraft under specific conditions. The modeling can, for example, be a mathematical model e.g. considering a mass of the aircraft, a shape of the aircraft, power consumption properties of a drive means of the aircraft and a propeller geometry of the aircraft, but also a current flight state of the aircraft and current flight conditions of the aircraft, or individual ones of these quantities. The current flight state of the aircraft can comprise at least one of a flight height of the aircraft, a flight speed of the aircraft over ground, a climbing speed of the aircraft, a sinking speed of the aircraft, a rotation of the aircraft, a flight attitude of the aircraft, a position of the aircraft, and an extent of an electrical heating of a component of the aircraft. The current flight conditions of the aircraft can comprise at least one of an ambient temperature of the aircraft, an ambient air humidity of the aircraft, an ambient air pressure of the aircraft, an estimated ambient wind speed of the aircraft, an air drag of the aircraft, and a lift of the air craft.

The mathematical model can have been ascertained by experiments in advance.

A simple model can be implemented by means of a look-up table (LUT) which is provided in the device according to the invention (e.g. stored in a memory of the device according to the invention).

This simple model can, for example, be determined for the flight maneuver "keeping height". An appropriate look-up table can, for example, have a weight of the aircraft and a flight height of the aircraft or a prevailing air pressure as input variables, and an electrical drive current (e.g. in case the lift-generating members 11 comprise electric motors) necessary for a "keeping of the height", i.e., a hovering flight at a specific height, as output variable. Thus, by means of this look-up table, the necessary electric drive current can be ascertained as the estimated power feed for the flight maneuver "keeping height" (without icing) with the weight of the aircraft and the flight height of the aircraft or the prevailing air pressure being known.

This simple model can further be determined for the flight maneuver "climbing". An appropriate look-up table can, for example, have a weight of the aircraft, a flight height of the aircraft or a prevailing air pressure, as well as a climbing speed as input variables, and an electric drive current (e.g. in case the lift-generating members 11 comprise electric motors) necessary for a "climbing", as output variable. Thus, by means of this look-up table, the necessary electric drive current can be ascertained as the estimated power feed for the flight maneuver "climbing" (without icing) with the weight of the aircraft, the flight height of the aircraft or the prevailing air pressure and the climbing speed being known.

The flight maneuvers "keeping height" or "climbing" could, for example, be started especially for the ascertainment of a possibly actual icing. However, the ascertainment of a possibly actual icing can also take place anytime during the ongoing operation of the aircraft (for example, in consideration of a current flight maneuver).

Other models for other flight maneuvers (for instance: "sinking", "crosswind compensation", combined flight maneuvers) are conceivable just like models which combine all or several flight maneuvers in themselves.

However, the more complex and comprehensive the flight maneuver to be considered or the amount of the flight maneuvers to be considered and the input quantities to be considered are, the more likely the model will be executed in the form of one or more calculation formulas determined in advance.

Now, if, by means of the comparison of the actual power consumption with the power consumption estimated by means of the above-described models, an actual icing is assumed, suitable icing counter-measures can be taken. If these icing counter-measures are of an electrical or electro-mechanical nature, this course of action according to the invention can lead to a lowering of the electrical consumption due to icing counter-measures. If these icing counter-measures are of a chemical nature, for example, this course of action according to the invention can give rise to a reduction of the consumption of the chemical agent due to icing counter-measures, so that less chemical agent has to be carried along, i.e., further weight can be saved.

If icing counter-measures are taken and on the assumption that these are effective, the flight behavior of the aircraft has to change towards the flight behavior without icing. Thus, if, after the initiation of the icing counter-measures, a difference between the estimated power feed and the actual power feed is observed, the success of the icing counter-measures can be monitored. If the icing counter-measures are not successful, this may mean that they are insufficient, or that there is no icing at all, i.e., the icing counter-measures cannot show any effect whatsoever. Hence, according to the invention, if there is no success, the icing counter-measures could be applied to a higher extent, or the conclusion of the actual presence of icing could be revised.

For example, the aircraft according to the invention can be a meteorological aircraft such as a meteodrone. By means of the method according to the invention (e.g. by the device according to the invention of the aircraft according to the invention), the ascertained actual icing cannot only be considered for the triggering of icing counter-measures; these resultant data may also be stored (e.g. together with place and time of the occurrence) for being used for meteorological models and forecasts. Particularly as measurement or forecast indications quantified as icing indications known in aviation (e.g. light icing, moderate icing and severe icing), these can, supplied with exact indications of place and time, increase the flight safety of other aircrafts provided with this information.

The invention claimed is:

1. A method for determining icing on an aircraft, the method comprising:
   acquiring, by a processor connected to one or more systems of the aircraft, data related to a current flight state of the aircraft;
   acquiring, by the processor, data related to current flight conditions of the aircraft;
   executing, by the processor, a model of the aircraft, wherein the model uses the acquired current flight state and current flight conditions of the aircraft as input parameters to generate an output that includes at least an estimated power feed generated by a power supply;
   supplying, by the power supply, the power feed to one or more components of the aircraft configured to perform at least one of a flight control operation and an in-flight maneuver in the current flight state under the current flight conditions;
   receiving, by the processor, a measure of an actual power feed provided by the power supply to the one or more components of the aircraft in performing at least one of the flight control operation and the in-flight maneuver;
   comparing, by the processor, the output of the model with the actual power feed of the power supply of the aircraft; and
   determining, by the processor, a presence of icing on the aircraft when a probability of an existence of icing conditions exceeds a predetermined probability threshold and the estimated power feed exceeds the actual power feed by a predetermined amount.

2. The method according to claim 1, comprising:
   acquiring environmental conditions of the aircraft;
   determining a probability of an existence of icing conditions based on the environmental conditions; and
   ascertaining whether the probability of an existence of icing conditions exceeds the predetermined probability threshold.

3. The method according to claim 2, wherein the environmental conditions comprise:
   an ambient temperature and an ambient air humidity.

4. The method according to claim 3, wherein the environmental conditions comprise:
   at least one or more of a flight height of the aircraft, an ambient air pressure, an ambient dew point, a liquid water content, an ice water content, and a median volume diameter.

5. The method according to claim 1, wherein:
   the power supply is an electric power source;
   the estimated power feed is at least one or more of an electric current, an electric voltage and an electrical power; and
   the actual power feed is at least one of an electric current, an electric voltage, and an electrical power.

6. The method according to claim 1, wherein the estimating of the estimated power feed comprises:
   calculating the estimated power feed for the current flight state under the current flight conditions by using a model of the aircraft.

7. The method according to claim 6, wherein the model of the aircraft characterizes at least one or more of:
   a mass of the aircraft, a shape of the aircraft, power consumption properties of a drive means of the aircraft and a propeller geometry of the aircraft.

8. The method according to claim 1, comprising:
   measuring the actual power feed.

9. The method according to claim 1, comprising:
   triggering icing counter-measures of the aircraft only when a presence of icing on the aircraft is determined.

10. The method according to claim 9, comprising:
    verifying the determined presence of icing on the aircraft based on a temporal development of a difference between the estimated power feed and the actual power feed after the triggering of icing counter-measures of the aircraft.

11. The method according to claim 1, wherein the predetermined amount comprises:
    at least a first predetermined amount and a second predetermined amount which is larger than the first predetermined amount; and
    the determining of the presence of icing on the aircraft comprises:
    ascertaining a presence of a first degree of icing on the aircraft, when the estimated power feed exceeds the actual power feed by the first predetermined amount, and ascertaining a presence of a second degree of icing on the aircraft which is higher than the first degree of icing on the aircraft, when the estimated power feed exceeds the actual power feed by the second predetermined amount.

12. The method according to claim 11, comprising:
    outputting the ascertained first and/or second degree of icing on the aircraft.

13. The method according to claim 11, comprising:
    triggering icing counter-measures of the aircraft only when the presence of the second degree of icing on the aircraft has been ascertained.

14. The method according to claim 1, comprising:
    triggering a predetermined flight maneuver, for which an effect of a presence of icing on the aircraft is expected based on a difference between the estimated power feed and the actual power feed, under a predetermined triggering condition.

15. The method according to claim 1, wherein the current flight state of the aircraft comprises:
    at least one or more of a flight height of the aircraft, a flight speed of the aircraft over ground, a climbing speed of the aircraft, a sinking speed of the aircraft, a rotation of the aircraft, a flight attitude of the aircraft, a position of the aircraft, and an extent of an electrical heating of a component of the aircraft.

16. The method according to claim 1, wherein the current flight conditions of the aircraft comprise:
at least one or more of an ambient temperature of the aircraft, an ambient air humidity of the aircraft, an ambient air pressure of the aircraft, an estimated ambient wind speed of the aircraft, an air drag of the aircraft and a lift of the aircraft.

17. The method according to claim 1, comprising:
detecting, by the processor of the aircraft, a crosswind-caused deviation of the aircraft from a target absolute position;
feedback controlling, by the processor, an absolute position of the aircraft to the target absolute position based on the crosswind-caused deviation of the aircraft from the target absolute position by controlling drive elements associated with the one or more components of the aircraft;
establishing, by the processor, an expected value of a power requirement of the feedback control as the estimated power feed of the power supply of the aircraft, based on the crosswind-caused deviation of the aircraft from the target absolute position; and
receiving, by the processor, a measured value of the power requirement of the feedback control as the actual power feed of the power supply of the aircraft, based on power fed to the drive elements.

18. The method according to claim 17, wherein:
the target absolute position is a target trajectory; and
the absolute position is a trajectory.

19. A device for determining icing on an aircraft, the device comprising:
a control device including a processor, memory, and an interface, the control device being configured to perform operations of:
an acquiring means connected for acquiring data of a current flight state and data of current flight conditions from one or more systems of an aircraft;
the processor configured for executing a model of an aircraft, wherein the model uses the acquired current flight state and current flight conditions of the aircraft as input parameters to generate an output that includes at least an estimated power feed generated by a power supply of the aircraft, and the power supply is connected to provide the power feed to one or more components of the aircraft to perform at least one of a flight control operation and an in-flight maneuver in the current flight state under the current flight conditions;
the acquiring means further acquiring a measure of an actual power feed provided by the power supply to the one or more components of the aircraft in performing at least one of the flight control operation and the in-flight maneuver;
a comparison means for comparing the output of the model with the actual power feed of the power supply of the aircraft; and
a determination means for determining a presence of icing on the aircraft when a probability of an existence of icing conditions exceeds a predetermined probability threshold and the estimated power feed exceeds the actual power feed by a predetermined amount.

20. An aircraft, comprising:
a power supply;
a device for determining icing on the aircraft according to claim 19 based on outputs of the power supply; and
at least one lift-generating member operatively connected with the icing determining device, and configured to generate lift.

21. The aircraft according to claim 20, wherein:
the device for determining icing provides an output for triggering icing counter-measures, and/or for controlling the at least one lift generating member; and
the aircraft is a monocopter having a driven rotor as a lift-generating member or a multicopter having two, three, four, six, eight or twelve driven rotors as lift-generating members.

* * * * *